Figure 4:
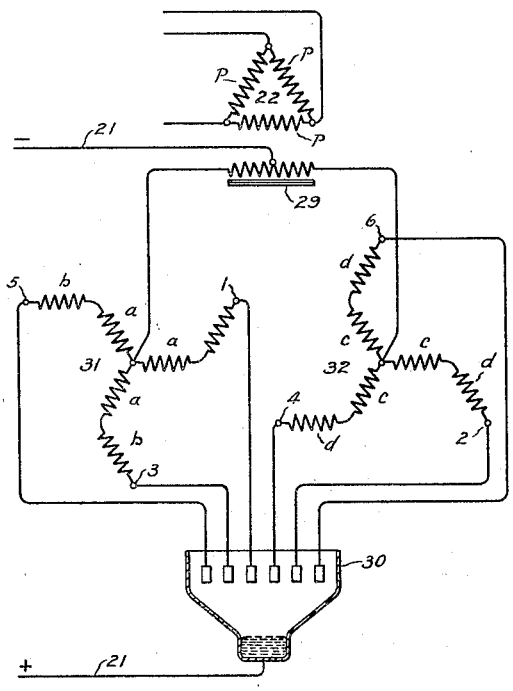

Jan. 24, 1933.  A. BOYAJIAN  1,895,370
ELECTRIC TRANSLATING SYSTEM
Filed June 17, 1932   2 Sheets-Sheet 1
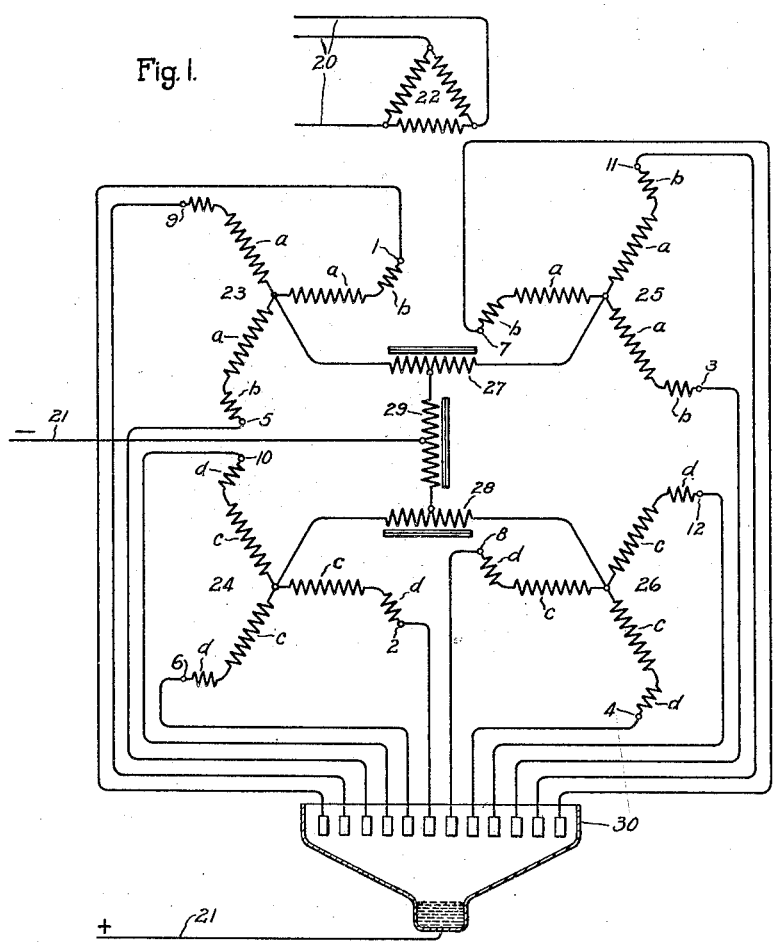
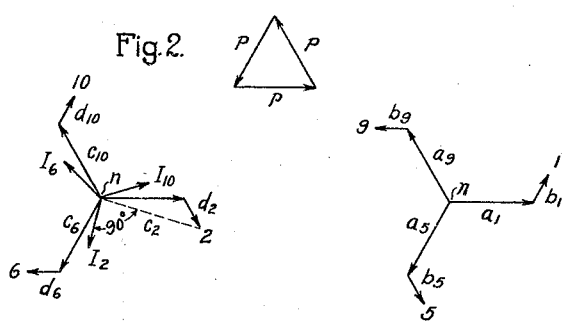
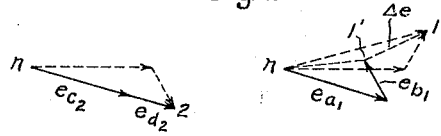
Inventor:
Aram Boyajian,
by Charles E. Mullen
His Attorney.

Jan. 24, 1933.   A. BOYAJIAN   1,895,370
ELECTRIC TRANSLATING SYSTEM
Filed June 17, 1932   2 Sheets-Sheet 2

Inventor:
Aram Boyajian,
by Charles V. Mullen
His Attorney.

Patented Jan. 24, 1933

1,895,370

UNITED STATES PATENT OFFICE

ARAM BOYAJIAN, OF PITTSFIELD, MASSACHUSETTS, ASSIGNOR TO GENERAL ELECTRIC COMPANY, A CORPORATION OF NEW YORK

ELECTRIC TRANSLATING SYSTEM

Application filed June 17, 1932. Serial No. 617,821.

My invention relates to electric translating systems and more particularly to such systems including transforming apparatus for transmitting energy between a pair of electric translating circuits, the transforming apparatus being provided with a winding system comprising multiple polyphase networks operating in parallel. While my invention is of general application, it is particularly suitable for transmitting energy between a polyphase alternating current circuit and a direct current circuit through an electric valve rectifier or rectifiers.

It is well known in the art that, when transmitting energy from an alternating current supply circuit to a direct current load circuit through an electric valve rectifier, such for example, as a mercury arc rectifier, the voltage regulation of the system and the wave form on both the alternating and direct current circuits are improved and the inductive interference decreased by increasing the equivalent number of phases of the secondary windings of the transformer in any of several well known manners. If the primary windings of such transformers are connected in mesh or ring and the electrical neutrals of the secondary windings are directly connected together, each of the several anode paths in the rectifier is active for only 1/$n$th of a cycle where $n$ is the equivalent number of phases of the secondary winding. In order to secure a better utilization of the rectifier apparatus, however, it is desirable to have several anodes active simultaneously. It has been found possible to secure this result by forming the secondary windings of the transformers into a plurality of independent polyphase networks and interconnecting these multiple networks through midtapped reactors known as interphase transformers. One particularly effective manner of securing an increase in the equivalent number of phases of the secondary windings of the transformer is to connect each of the several multiple secondary networks in star, each leg of the star being composed of a winding from two or more of the primary phases.

In this general type of transformer connection, which is known in the art as a zigzag connection, there has been some difficulty experienced in securing an equal division of load between the multiple secondary networks. Heretofore, it has been thought that the unbalance between the multiple secondary networks has been occasioned by inequalities in the line to neutral impedances of the several phases of the multiple secondary networks, and that if these impedances could be made exactly equal the unbalance problem would be solved. In order to secure this exact equality in the impedances of the several phases of the multiple secondary network, resort has been had to interwinding the several coils of the same phase relation in order to give them exactly the same percentage reactances so that their ohmic reactances might be determined solely by their number of turns. A more rigorous mathematical analysis, however, has determined that equality in impedances of the several phases of the multiple secondary networks is a necessary, but not a sufficient, condition for load balance between the secondary networks. On the other hand, any substantial unbalance in load between the multiple secondary networks lowers the efficiency of the transforming apparatus, decreases its rating and, when used in connection with rectifying apparatus, increases the susceptibility to arc backs and other disturbances in the system.

It is an object of my invention therefore, to provide an improved electric translating system for transmitting energy between a pair of electric translating circuits by means of transforming apparatus having a winding system comprising multiple polyphase networks operating in parallel, which will overcome the above mentioned disadvantages of the arrangements of the prior art, and which will be simple, reliable and economical in operation.

It is another object of my invention to provide an improved electric translating system for transmitting energy between a pair of electric translating circuits by means of transforming apparatus having a winding system comprising a plurality of multiple polyphase networks, by means of which an equal division of load between the multiple secondary networks may be insured.

It is a further object of my invention to provide an improved rectifying system for transmitting energy from an alternating current circuit to a direct current circuit and including transforming apparatus having a winding system comprising multiple polyphase networks, in which the efficiency and rating of the apparatus may be increased and its freedom from arc backs improved.

In accordance with my invention, a pair of electric translating circuits, one of which is a polyphase alternating current circuit, are interconnected through transforming apparatus including primary and secondary winding systems, one of the winding systems being a single polyphase network connected to the polyphase circuit and the other comprising multiple polyphase networks operating in parallel. An equal division of load between the multiple secondary networks is secured by so proportioning the coupling between the several windings of the multiple networks and the leakage reactances of the individual windings in accordance with formulæ developed hereinafter.

For a better understanding of my invention, together with other and further objects thereof, reference is had to the following description taken in connection with the accompanying drawings, and its scope will be pointed out in the appended claims. Referring to the drawings, Fig. 1 illustrates an arrangement embodying my invention for transmitting energy from a three-phase alternating current supply circuit to a direct current load circuit; Figs. 2 and 3 are vector diagrams to aid in the understanding of the operation of the arrangement shown in Fig. 1, while Fig. 4 shows a modification of the arrangement of Fig. 1, in which the secondary winding system is the equivalent of a six phase connection.

Referring now to Fig. 1 of the drawings, there is illustrated a system embodying my invention for transmitting energy from a three-phase alternating current circuit 20 to direct current circuit 21. This system includes a transforming apparatus consisting of a three-phase primary network 22 connected to the circuit 21 and four three-phase zigzag secondary networks 23, 24, 25 and 26. Each phase of these secondary networks comprise a main winding, or long coil, inductively related to each of the primary phases. The networks 23 and 25 have connected in series with the long coils auxiliary, or short, coils from the next preceding primary phase but reversed in polarity so as to be advanced in phase with respect to their long coils. These two networks are said to be forward zigzagged. On the other hand, the networks 24 and 26 have their auxiliary, or short, coils energized from the next succeeding primary phase also reversed in polarity so as to retard the phase of the resultant voltage. These networks are said to be backward zigzagged, that is, they are zigzagged oppositely to the networks 23 and 25. The long and short coils of the several networks 23–26, inclusive, are so proportioned that the voltages of the terminals 1–12, inclusive, are displaced in phase by thirty electrical degrees. The several windings of the above described transformer system may comprise a single polyphase transformer with a polyphase core or a bank of single phase transformers connected in polyphase relation, as is well understood by those skilled in the art.

The electrical neutrals of the networks 23 and 25 are interconnected through an interphase transformer 27, while the electrical neutrals of the networks 24 and 26 are interconnected through an interphase transformer 28 and the electrical neutrals of the interphase transformers 27 and 28 are interconnected through a third interphase transformer 29, the electrical midpoint of which is connected to the negative side of the direct current circuit 21. The above described connections, however, form no part of my present invention but are well known in the art. The several terminals 1–12, inclusive, are connected to the anodes of a mercury arc discharge device 30, the cathode of which forms the positive terminal of the direct current circuit 21. The several reference letters applied to the component winding elements of the several networks 23–26, inclusive, are for the reference purposes in an analysis which will be found hereinafter.

The general principles of operation of the above described rectifying system will be well understood by those skilled in the art. If the interphase transformers 27, 28 and 29 were omitted and the electrical neutrals of the several networks 23–26, inclusive, connected directly together, the apparatus would function as a straight twelve-phase rectifier. For example, if the anode connected to terminal 1 is initially conducting and the phase rotation is such that the anode connected to terminal 12 next reaches its maximum positive potential, as soon as the potential of the anode connected to the terminal 12 exceeds that of the anode connected to terminal 1, the difference of potential between these two terminals is such as to tend to extinguish the current of the anode connected to the terminal 1 and to build up the current from the anode connected to terminal 12, as is well understood by those skilled in the art. This transfer of current is opposed only by the leakage reactance of the transformer winding which is relatively small. Except for this period of transfer, or commutating, period, each of the anodes would tend to be conductive for only thirty electrical degrees. It will be noted that the successive terminals are associated with different networks. Hence, by interposing the interphase transformers 27, 28 and 29 between the networks and giving these interphase transformers a considerable reactance, the transfer of the current between terminals associated with different networks may be minimized to any desired extent so that the current will tend to transfer only between those terminals associated with the same network. Under these conditions, four of the anodes of the mercury arc rectifier 30 will be active simultaneously, each conducting current for 120 electrical degrees of each cycle, and the several networks 23-26, inclusive, operate in parallel to supply current to the direct current circuit 21. Hence, any dissymmetry in the coupling or the leakage reactances of the several phases of the secondary network will tend to unbalance the load distribution between the several networks. As stated above, it has been thought heretofore that, if the terminal impedances of all of the phases of the several networks were made exactly equal, the load distribution between the several networks would also be equalized. This may be disproved as follows:

Considering the primary network 22 and the secondary networks 23 and 24 only, the vector diagrams of the normal voltages induced in the several winding elements by the primary windings are as illustrated in Fig. 2, in which each vector is designated by a reference letter corresponding to its respective winding element as identified in Fig. 1. It will be assumed that the network 24 is short circuited, that the network 23 is open circuited, and that the resistance drops in the transformer circuit may be neglected. It will also be assumed that all of the long coils $a$ and $c$ having the same phase relation are completely interwound and, similarly, all the short coils $b$ and $d$. With this last assumption, all the long coils will necessarily have identical reactances, and, similarly, all the short coils. With no losses in the transforming apparatus, the current flowing in the network 24 will be represented by the vectors $I_2$, $I_6$ and $I_{10}$, lagging their respective terminal voltages by substantially 90 electrical degrees. Since all the "$a$" and "$c$" coils are interwound, and similarly all the "$b$" coils and "$d$" coils, I have three representative coils, namely, the primary coil "$p$", the long secondary coil "$a$" and the short secondary coil "$b$"; and I may apply to them the well-known three-circuit theory. (For a discussion of three circuit reactances of multi-winding transformers, reference is made to a paper "Theory of three circuit transformers" by A. Boyajian, Journal A. I. E. E., 1924, pp. 345-355). Accordingly, the individual reactances of all the $a$'s and $c$'s, which are completely interwound, may be represented by the term $X_{a(bp)}$; similarly, all of the "$b$" and "$d$" coils being completely interwound, their reactances may be represented by the term $X_{b(ap)}$; $X_{a(bp)}$ and $X_{b(ap)}$ being the three circuit reactances of the coils $a$ with respect to the coils $b$ and $p$ on the same core leg, and of the coils $b$ with respect to the coils $a$ and $p$ on the same core leg, respectively. Under these conditions, the voltage consumed by the impedance drops of the coils of one of the secondary phases, for example phase 2 will be:

$$e_{c_2} = I_2 X_{a(bp)} \atop e_{d_2} = I_2 X_{b(ap)} \Bigg\} \quad (1)$$

The resultant impedance drop $(e_{c_2} + e_{d_2})$ will be equal and opposite to the resultant of the voltages induced in these coils by the primary winding although the individual coil voltages will not be equal to the individual impedance drops, as indicated in Fig. 3.

To construct the vector diagram of the voltages in phase 1, it must be noted that $$e_{a_1} = e_{c_2} \atop e_{b_1} = e_{d_{10}} = I_{10} X_{b(ap)} \Bigg\} \quad (2)$$

by virtue of the interwinding of the coils. This is illustrated in the right hand vector diagram of Fig. 3. Thus it is seen that unlike phase 2, the resultant impedance voltage $n-1'$ induced in phase 1 is not equal and opposite to the resultant voltage induced by the primary winding and that it is lagging in phase (under the assumed conditions though in some instances it may be leading). If the network 23 be short circuited and the network 24 open circuited and its windings used as voltmeter coils, the impedance voltages appearing in the phases 2, 6 and 10 due to the load currents in phases 1, 3 and 5 will be the converse of that described above, that is, leading the normal induced voltages in the phases 2, 6 and 10.

It follows from the above that, with equal loads in the two secondary networks, there will be a tendency to advance the phase of the resultant voltages of one secondary and retard those of the other and this gives rise to an unbalance voltage tending to circulate a current between the two networks. This circulating current vectorially adds to the normal current of one secondary network and subtracts from that of the other. If $(e_{n-1'})$ is the voltage induced in phase 1 by the current in the network 24 and $(e_{n-2'})$ is the voltage induced in phase 2 by the current in network 24, then the voltage tending to produce a circulating current may be represented by the equation:

$$\Delta e = e_{n-1'} - e_{n-2'} \diagup + \Theta \quad (3)$$

where $\Theta$ is the normal angular displacement by which the normal voltage of phase 1 leads that of phase 2. As might be expected from the foregoing, the unbalance voltage reverses polarity with a reversal of phase rotation, thus reversing the relative division of load between the two networks. If an analysis be made of the voltage conditions of only the networks 23 and 25, which, it is seen, are zigzagged in the same direction so that the angles between the long and short coils of both networks are equal in magnitude and sign, it will be found that no unbalance voltage exists. Hence the phenomenon just described is evidently limited to the case of multiple transformer networks in which at least some of the networks involve a cross connection of phases and in which this cross connection produces a phase displacement between the component winding elements which is different from that between the component winding elements of the other networks which may or may not involve a cross connection between phases.

Obviously, if the vector $(e_{n-1'})$ of Fig. 3 should fall on the vector $(e_{n-1})$ the unbalance voltage would be zero and the secondary networks would be equally loaded. My invention is directed to a transformer design which will fulfill that condition.

The analysis given above was made on the assumption that all of the corresponding winding elements (long coils and short coils) of the same phase relation are completely interwound. The more general case is that in which there is no interwinding of the winding elements but a certain amount of leakage reactance between them, in which case the three-circuit impedances of the coils $a$ and $c$ and $b$ and $d$, may be unequal. Since, for most practical designs, the question of unbalance does not arise between similarly cross connected symmetrical multiple networks, an analysis will be made, as above, considering only the primary network 22 and the secondary networks 23 and 24. The analysis will be made for the general case of a plurality of three phase zigzag secondary networks so proportioned as to give an equivalent of $n$-phase operation. With symmetrical polyphase currents in all the secondaries, the impedance voltages from neutral to phases 1 and 2 will then be:

$$e_{n-1} = \{I_1[Z_{p(a_1b_9)}k_{a_1}^2 + Z_{a_1(pb_9)}k_{a_1}^2 + \quad (4)$$
$$Z_{p(b_1a_5)}k_{b_1}^2 + Z_{b_1(pa_5)}k_{b_1}^2 + Z_1] -$$
$$I_9 Z_{p(b_9a_1)}k_{b_9}k_{a_1} - I_5 Z_{p(a_5b_1)}\} +$$
$$\{I_2 Z_{p(c_2a_1)}k_{c_2}k_{a_1} - I_6 Z_{p(d_6a_1)}k_{d_6}k_{a_1} -$$
$$I_6 Z_{p(c_6b_1)}k_{c_6}k_{b_1} + I_{10} Z_{p(d_{10}b_1)}k_{d_{10}}k_{b_1}\}$$

$$e_{n-2} = \{I_2[Z_{p(c_2d_6)}k_{c_2}^2 + Z_{c_2(pd_6)}k_{c_2}^2 + \quad (5)$$
$$Z_{p(d_2c_{10})}k_{d_2}^2 + Z_{d_2(pc_{10})}k_{d_2}^2 + Z_2] -$$
$$I_{10} Z_{p(c_{10}d_2)}k_{c_{10}}k_{d_2} - I_6 Z_{p(d_6c_2)}k_{d_6}k_{c_2}\} +$$
$$\{I_1 Z_{p(a_1c_2)}k_{a_1}k_{c_2} - I_9 Z_{p(b_9c_2)}k_{b_9}k_{c_2} -$$
$$I_9 Z_{p(a_9d_2)}k_{a_9}k_{d_2} + I_5 Z_{p(b_5d_2)}k_{b_5}k_{d_2}\}$$

in which the group of terms included in the first set of braces { } of each equation represents the vectorial voltage regulation in the respective phase due to the current in its own network and the group of terms included in the second set of braces { } represents the vectorial voltage regulation in the respective phase due to the currents in the other network; in which the factors "$k$" are proportional to the number of turns in the coils indicated by the subscripts, or, more conveniently, to the coil voltage as a fraction of the phase voltage (line-to-neutral), and in which the terms $Z_1$ and $Z_2$ are the external impedances in the respective phases. Currents and impedances are preferably expressed as percentages based on an assumed standard kva load, as is customary in the transformer art.

For such conditions of operation as are equivalent to balanced parallel operation, the two vectorial regulations $e_{n-1}$ and $e_{n-2}$ are numerically equal to each other and displaced from each other by a phase angle equal to the normal angular displacement between the corresponding phase voltages at no load. The relative magnitudes and phases of the currents in the networks 23 and 24 will, therefore, be such as to satisfy the condition:

$$e_{n-1} = e_{n-2} \angle 360°/n \quad (6)$$

where $n$ is the equivalent number of phases of the secondary winding system.

If the networks 23 and 24 are designed symmetrically with reference to the primary network 22, their vectorial regulations due to their own currents will, under balanced load conditions, be equal, taking into consideration their angular displacement as given in Equation (6). Therefore, for balanced operation, the voltage regulation of one network due to its external impedance and current flowing in the other network must equal that of the latter network due to its external impedance and current in the former. That is, the groups of terms within the second sets of braces of Equations (4) and (5) may be equated as follows:

$$I_1 Z_1 + I_2 Z_{p(c_2a_1)}k_{c_2}k_{a_1} - \quad (7)$$
$$I_6 Z_{p(d_6a_1)}k_{d_6}k_{a_1} - I_6 Z_{p(c_6b_1)}k_{c_6}k_{b_1} +$$
$$I_{10} Z_{p(d_{10}b_1)}k_{d_{10}}k_{b_1} = [I_2 Z_2 +$$
$$I_1 Z_{p(a_1c_2)}k_{a_1}k_{c_2} - I_9 Z_{p(b_9c_2)}k_{b_9}k_{c_2} -$$
$$I_9 Z_{p(a_9d_2)}k_{a_9}k_{d_2} + I_5 Z_{p(b_5d_2)}k_{b_5}k_{d_2}] \angle 360°/n$$

In the usual case, each of the networks 23 and 24 are symmetrical so that the subnumbers of the subscripts $a$, $b$, $c$ and $d$ may be omitted. In addition all of the currents may be expressed in terms of $I_1$ in accordance with the following equations:

$$I_2 = I_1 \underline{/-360°/n}$$
$$I_5 = I_1 \underline{/-120°}$$
$$I_6 = I_1 \underline{/-120° - 360°/n} \quad (8)$$
$$I_9 = I_1 \underline{/+120°}$$
$$I_{10} = I_1 \underline{/+120° - 360°/n}$$

Equation (7) may thus be simplified as follows:

$$Z_1 - Z_2 + Z_{p(ac)} k_a k_c \underline{/-360°/n} - Z_{p(ac)} k_a k_c \underline{/360°/n} - (Z_{p(ad)} k_a k_d + \qquad (9)$$
$$Z_{p(bc)} k_b k_c) \underline{/-120° - 360°/n} + (Z_{p(bc)} k_b k_c + Z_{p(ad)} k_a k_d) \underline{/120° + 360°/n} +$$
$$Z_{p(bd)} k_b k_d \underline{/120° - 360°/n} - Z_{p(bd)} k_b k_d \underline{/-120° + 360°/n} = 0$$

Again the more common case is that in which the "$a$" and "$c$" coils are interwound duplicates, and similarly the "$b$" and "$d$" coils, so that Equation (9) can be further simplified by letting "$a$" represent all of the long coils and "$b$", all of the short coils; in addition the load impedance may be assumed as symmetrical, so that the external impedances may be neglected:

$$Z_{p(a)} k_a^2 (\underline{/-360°/n} - \underline{/360°/n}) + 2 Z_{p(ab)} k_a k_b (\underline{/120° + 360°/n} \underline{/-120° - 360°/n}) + \qquad (10)$$
$$Z_{p(b)} k_b^2 (\underline{/120° - 360°/n} - \underline{/-120° + 360°/n}) = 0$$

Finally, considering the specific case described above in connection with Fig. 1, it is well known that $k_a = 0.817$ and $k_b = 0.299$, while $n = 12$. Making these substitutions, the following results are obtained:

$$0.668 Z_{p(a)} - 0.488 Z_{p(ab)} - 0.179 Z_{p(b)} = 0 \quad (11)$$

But $$\left. \begin{array}{l} Z_{p(a)} = Z_{p(ab)} + Z_{a(pb)} \\ Z_{p(b)} = Z_{p(ab)} + Z_{b(pa)} \end{array} \right\} \quad (12)$$

Substituting Equation (12) in (11) gives:

$$Z_{b(pa)} = 3.74 Z_{a(bp)} \text{ (In percentages)} \quad (13)$$

In case the resistances of the windings are negligible compared with their reactances, this may be written:

$$X_{b(pa)} = 3.74 X_{a(bp)} \quad (13a)$$

The ratios expressed in Equation (13) apply to the percentage values of the coil reactances. If the ratios of the ohmic values of the reactances are desired, these may be obtained by remembering that they vary as the square of the number of turns. Hence, $$Z_{b(pa)} = 3.74 \left( \frac{0.299}{0.817} \right)^2 Z_{a(bp)} = \quad (14)$$
$$0.50 Z_{a(bp)} - \text{(in ohms)}$$

In Fig. 4 is shown a modification of my invention in which the secondary winding system of the supply transformer comprises two three-phase zigzag windings 31 and 32, the terminal voltages of which are displaced 60 electrical degrees so as to give the equivalent of six-phase operation. The networks are zigzagged oppositely in a manner similar to the networks 23 and 24 in Fig. 1. The system as a whole is also connected in a manner similar to that of Fig. 1. In this case, however, the two component winding elements or coils of each phase are of the same length. The ratios of the reactances of the "$a$" and "$b$" coils may be found for the general case substituting $n=6$, $k_a = k_b = k_c = k_d = 0.577$ in Equation (9) and for the specific case of complete interwinding and symmetrical load, by substituting these same values in Equation (10).

From the above, it will be seen that my invention is applicable to any polyphase multiple winding transformer system in which one or more of the multiple windings involve cross connections between the phases dissimilar to the component winding elements of the other multiple windings. In each case, if the reactances of the transformer are so designed, as explained above, that the impedance drops in each phase of the several multiple windings are equal and have the same phase relation to their respective terminal voltages, the load current will divide equally between the multiple windings.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. An electric translating system comprising a pair of electric translating circuits, one of said circuits being a polyphase alternating current circuit, transforming means interconnecting said circuits and including primary and secondary winding systems, one of said winding systems comprising multiple polyphase networks operating in parallel and the other comprising a single polyphase network connected to said polyphase circuit, each phase of certain of said multiple networks comprising winding elements inductively related to a plurality of the phases of said single network, said winding elements being displaced in phase by an angle different than that between any component elements of the phases of certain other of said multiple networks, and the leakage reactances of the component elements of each phase of said multiple networks being so proportioned that, when said networks are carrying current in proportion to their ratings, their resultant counter-electromotive forces will have the same vectorial relation to their respective terminal voltages.

2. An electric translating system comprising a pair of electric translating circuits, one of said circuits being a polyphase alternating current circuit, transforming means interconnecting said circuits and including primary and secondary winding systems, one of said winding systems comprising multiple polyphase networks operating in parallel and the other comprising a single polyphase network connected to said polyphase circuit, each phase of certain of said multiple networks comprising winding elements inductively related to a plurality of the phases of said single network, said winding elements being displaced in phase by an angle different than that between any component elements of the phases of certain other of said multiple networks, corresponding winding elements of the same phase relation of said multiple networks being substantially completely coupled, and the leakage reactances of the component elements of each phase of said multiple networks being so proportioned that, when said networks are carrying current in proportion to their ratings, their resultant counter-electromotive forces will be vectorially equal with respect to their corresponding terminal voltages.

3. An electric translating system comprising a pair of electric translating circuits, one of said circuits being a polyphase alternating current circuit, transforming means interconnecting said circuits and including primary and secondary winding systems, one of said winding systems comprising multiple polyphase networks operating in parallel and the other comprising a single polyphase network connected to said polyphase circuit, each phase of certain of said multiple networks comprising winding elements inductively related to a plurality of the phases of said single network, said winding elements being displaced in phase by an angle different than that between any component elements of the phases of certain other of said multiple networks, and the percentage leakage reactances of the component elements of each phase of said multiple networks being unequalized to secure a load distribution between said multiple networks in proportion to their ratings.

4. An electric translating system comprising a pair of electric translating circuits, one of said circuits being a polyphase alternating current circuit, transforming means interconnecting said circuits and including primary and secondary winding systems, one of said winding systems comprising multiple polyphase networks operating in parallel and the other comprising a single polyphase network connected to said polyphase circuit, each phase of certain of said multiple networks comprising winding elements inductively related to a plurality of the phases of said single network, said winding elements being displaced in phase by an angle different than that between any component elements of the phases of certain other of said multiple networks, and the leakage reactances of the component elements of each phase of said multiple networks being so proportioned that the counter-electromotive forces induced in the several phases of the multiple networks by the currents flowing in the other networks have the same phase relation to the terminal voltages of their respective phases.

5. An electric translating system comprising a pair of electric translating circuits, one of said circuits being a polyphase alternating current circuit, transforming means interconnecting said circuits and including primary and secondary winding systems, one of said winding systems comprising multiple polyphase networks operating in parallel and the other comprising a single polyphase network connected to said polyphase circuit, each phase of certain of said multiple networks comprising winding elements inductively related to a plurality of the phases of said single network, said winding elements being displaced in phase by an angle different than that between any component elements of the phases of certain other of said multiple networks, and the leakage reactances of the component elements of each phase of said multiple networks being so proportioned that the counter-electromotive force induced in each of the phases of the multiple networks by the currents flowing in the other networks is substantially in phase with the electromotive force induced in that phase by the magnetizing current of said transforming means.

6. An electric translating system comprising a pair of electric translating circuits, one of said circuits being a polyphase alternating current circuit, transforming means interconnecting said circuits and including primary and secondary winding systems, one of said winding systems comprising multiple polyphase networks operating in parallel and the other comprising a single polyphase network connected to said polyphase circuit, each phase of said multiple networks comprising winding elements inductively related to a plurality of the phases of said single network, said winding elements of each phase of certain of said networks being displaced in phase by an angle different from that between those of certain other of said networks, and the leakage reactances of the component elements of each phase of said multiple networks being so proportioned that, when said networks are carrying current in proportion to their ratings, their resultant counter-electromotive forces will have the same vectorial relation to their respective terminal voltages.

7. An electric translating system comprising a pair of electric translating circuits, one of said circuits being a polyphase alternating current circuit, transforming means interconnecting said circuits and including primary and secondary winding systems, one of said winding systems comprising multiple polyphase networks operating in parallel and the other comprising a single polyphase network connected to said polyphase circuit, each phase of said multiple networks comprising winding elements inductively related to a plurality of the phases of said single network, said winding elements of each phase of certain of said networks being displaced in phase by an angle equal and opposite to that between the winding elements of certain other of said networks, and the leakage reactances of the component elements of each phase of said multiple networks being so proportioned that, when said networks are carrying current in proportion to their ratings, their resultant counter-electromotive forces will have the same vectorial relation to their respective terminal voltages.

8. An electric translating system comprising a pair of electric translating circuits, one of said circuits being a polyphase alternating current circuit, transforming means interconnecting said circuits and including primary and secondary winding systems, one of said winding systems comprising multiple polyphase networks operating in parallel and the other comprising a single polyphase network connected to said polyphase circuit, each phase of certain of said multiple networks comprising a main winding element inductively related to a phase of said single network and an auxiliary winding element inductively related to the next succeeding phase of said single network and each phase of certain other of said multiple networks comprising a main winding element inductively related to the same phase of said single network as said first mentioned main winding element and an auxiliary winding element inductively related to the next preceding phase of said single network, and the leakage reactances of the component elements of each phase of said multiple networks being so proportioned that, when said networks are carrying current in proportion to their ratings, their resultant counter-electromotive forces will have the same vectorial relation to their respective terminal voltages.

9. An electric translating system comprising a pair of electric translating circuits, one of said circuits being a polyphase alternating current circuit, transforming means interconnecting said circuits and including primary and secondary winding systems, one of said winding systems comprising multiple zigzag networks operating in parallel and the other comprising a single polyphase network connected to said polyphase circuit, certain of said multiple networks being zigzagged oppositely to certain others, and the leakage reactances of the component winding elements of each phase of said zigzag networks being so proportioned that when said networks are loaded in proportion to their ratings, their resultant counter-electromotive forces will have the same vectorial relation to their respective terminal voltages.

10. An electric translating system comprising a pair of electric translating circuits, one of said circuits being a polyphase alternating current circuit, transforming means interconnecting said circuits and including primary and secondary winding systems, one of said winding systems comprising a plurality of multiple polyphase networks operating in parallel and forming the equivalent of an $n$-phase system and the other comprising a single polyphase network consisting of a plurality of phase windings "$p$" connected to said polyphase circuit, each phase of certain of said multiple networks comprising a main winding element "$a$" inductively related to a phase of said single network and an auxiliary winding element "$b$" inductively related to the next succeeding phase of said single network and each phase of certain other of said multiple networks comprising a main winding element "$c$" inductively related to the same phase of said single network as said first mentioned main winding element and an auxiliary winding element "$d$" inductively related to the next preceding phase of said single network, and the percentage leakage reactances of the several windings of the same phase relation and the percentage leakage reactances of the component winding elements of each phase of said multiple networks being determined by the following formula:

$$Z_{p(ac)}k_a k_c \underline{/-360°/n} - Z_{p(ac)}k_a k_c \underline{/360°/n} - (Z_{p(ad)}k_a k_d + Z_{p(bc)}k_b k_c)\underline{/-120°-360°/n} +$$
$$(Z_{p(bc)}k_b k_c + Z_{p(ad)}k_a k_d)\underline{/120°+360°/n} + Z_{p(bd)}k_b k_d \underline{/120°-360°/n} -$$
$$Z_{p(bd)}k_b k_d \underline{/-120°+360°/n} = 0$$

in which the various terms are defined in the specification.

11. An electric translating system comprising a pair of electric translating circuits, one of said circuits being a three-phase alternating current circuit, transforming means interconnecting said circuits and including primary and secondary winding systems, one of said winding systems comprising a single three phase network connected to said three phase circuit, and the other comprising four three-phase networks operating in parallel with cross connections between the phases of each network to displace the terminal voltages of said networks to give the equivalent of twelve phase operation, inductive means interconnecting said four networks to force them to operate approximately as independent three-phase circuits, one pair of said networks involving a cross connection of phases opposite to that of the other pair, and the leakage reactances of the component windings of each phase of said four networks being so proportioned that, when said networks are loaded in proportion to their ratings, their resultant counter-electromotive forces will have the same vectorial relation to their respective terminal voltages.

12. An electric translating system comprising a pair of electric translating circuits, one of said circuits being a three-phase alternating current circuit, transforming means interconnecting said circuits and including primary and secondary winding systems, one of said winding systems comprising a single three-phase network connected to said three-phase circuit, and the other comprising four three-phase zigzag networks operating in parallel and comprising long and short coils, the long and short coils of each phase of said zigzag networks being so proportioned as to give the equivalent of twelve phase operation and two of said networks being zigzagged oppositely to the other two, the long coils and the short coils of the same phase relation being substantially completely coupled, inductive means interconnecting said four networks to force them to operate approximately as three-phase circuits, and the leakage reactance of the long coils being substantially twice that of the short coils.

13. An electric translating system comprising a pair of electric translating circuits, one of said circuits being a polyphase alternating current circuit, transforming means interconnecting said circuits and including primary and secondary winding systems, one of said winding systems comprising a single polyphase network connected to said polyphase circuit and the other comprising multiple polyphase networks operating in parallel to form the equivalent of an $n$-phase system, each phase of certain of said multiple networks comprising a main winding element inductively related to a phase of said single network and an auxiliary winding element inductively related to the next succeeding phase of said single network and each phase of certain other of said multiple networks comprising a main winding element inductively related to the same phase of said single network as said first mentioned main winding element and an auxiliary winding element inductively related to the next preceding phase of said single network, all of said main winding elements of the same phase relation being substantially completely coupled, all of said auxiliary winding elements of the same phase relation being substantially completely coupled, and the leakage reactances of the several winding elements being determined by the following formula:

$$Z_{p(a)}k_a^2 \angle -360°/n - Z_{p(a)}k_a^2 \angle 360°/n + 2Z_{p(ab)}k_ak_b \angle 120°+360°/n - 2Z_{p(ab)}k_ak_b \angle -120°-360°/n + Z_{p(b)}k_b^2 \angle 120°-360°/n - Z_{p(b)}k_b^2 \angle -120°+360°/n = 0$$

in which the various terms are as defined in the specification.

14. An electric translating system comprising a pair of electric translating circuits, one of said circuits being a three-phase alternating current circuit, transforming means interconnecting said circuits and including primary and secondary winding systems, one of said winding systems comprising a single three phase network connected to said three-phase circuit, and the other comprising four three-phase zigzag networks operating in parallel and comprising long and short coils, the long and short coils of each phase of said zigzag networks being so proportioned as to give the equivalent of twelve phase operation and two of said networks being zigzagged oppositely to the other two, the long coils and short coils of the same phase relation being substantially completely coupled, inductive means interconnecting said four networks to force them to operate approximately as three phase circuits, and the percentage leakage reactance of the long coils being substantially 3.74 times that of the short coils.

15. An electric translating system comprising a pair of electric translating circuits, one of said circuits being a three-phase alternating current circuit, transforming means interconnecting said circuits and including primary and secondary winding systems, one of said winding systems comprising a single three-phase network connected to said three-phase circuit, and the other comprising two three-phase networks operating in parallel with cross connections between the phases of each network to displace the terminal voltages of said networks to give the equivalent of six phase operation, inductive means interconnecting said two networks to force them to operate approximately as independent three-phase circuits, one of said networks involving a cross connection of phases opposite to that of the other, and the leakage reactances of the component windings of each phase of said two networks being so proportioned that, when said networks are loaded in proportion to their ratings, their resultant counter-electromotive forces will have the same vectorial relation to their respective terminal voltages.

16. A rectifying system comprising a polyphase alternating current supply circuit, a direct current load circuit, multiple anode rectifying apparatus, transforming apparatus including a primary winding system comprising a polyphase network connected to said supply circuit and a secondary winding system comprising multiple secondary polyphase networks connected in parallel to said load circuit through said rectifying apparatus, each phase of certain of said secondary networks comprising component winding elements inductively related to a plurality of the phases of said primary network, said winding elements being displaced in phase by an angle different than that between any component elements of the phases of certain other of said secondary networks, and the leakage reactances of the component elements of each phase of said secondary networks being so proportioned that when said networks are carrying current in proportion to their ratings, their resultant counter-electromotive forces will have the same vectorial relation to their respective terminal voltages.

17. A rectifying system comprising a polyphase alternating current supply circuit, a direct current load circuit, multiple anode rectifying apparatus, transforming apparatus including a primary winding system comprising a polyphase network connected to said supply circuit and a secondary winding system comprising four three phase zigzag networks connected in parallel to said load circuit through said rectifying apparatus and comprising long and short coils, the long and short coils of each phase of said zigzag networks being so proportioned as to give the equivalent of twelve phase operation and two of said networks being zigzagged oppositely to the other two, the long coils and short coils of the same phase relation being substantially completely coupled, inductive means interconnecting said four networks to force them to operate approximately as three-phase circuits, and the percentage leakage reactance of the long coils being substantially 3.74 times that of the short coils.

18. Polyphase transformer apparatus comprising primary and secondary winding systems, one of said winding systems comprising a single polyphase network and the other comprising multiple polyphase networks, each phase of certain of said multiple networks comprising winding elements inductively related to a plurality of the phases of said single network, said winding elements being displaced in phase by an angle different than that between any component elements of the phases of certain other of said multiple networks, and the leakage reactances of the component elements of each phase of said multiple networks being so proportioned that, when said networks are carrying current in proportion to their ratings, their resultant counter-electromotive forces will have the same vectorial relation to their respective terminal voltages.

19. Polyphase transformer apparatus comprising primary and secondary winding systems, one of said winding systems comprising a single polyphase network and the other comprising multiple zigzag polyphase networks, certain of said multiple networks being zigzagged oppositely to certain others, and the leakage reactances of the component winding elements of each phase of said zigzag networks being so proportioned that when said networks are loaded in proportion to their ratings, their resultant counter-electromotive forces will have the same vectorial relation to their respective terminal voltages.

20. Polyphase transformer apparatus comprising primary and secondary winding systems, said primary winding system comprising a single polyphase network and said secondary winding system comprising four three-phase zigzag networks comprising long and short coils, the long and short coils of each phase of said zigzag networks being so proportioned as to give the equivalent of twelve phase operation and two of said networks being zigzagged oppositely to the other two, the long coils and short coils of the same phase relation being substantially completely coupled, and the percentage leakage reactance of the long coils being substantially 3.74 times that of the short coils.

In witness whereof I have hereunto set my hand.

ARAM BOYAJIAN.